United States Patent
Bao et al.

(10) Patent No.: US 10,552,161 B2
(45) Date of Patent: Feb. 4, 2020

(54) CLUSTER GRAPHICAL PROCESSING UNIT (GPU) RESOURCE SHARING EFFICIENCY BY DIRECTED ACYCLIC GRAPH (DAG) GENERATION

(71) Applicant: INTERNATIONAL BUSINESS MACHINES CORPORATION, Armonk, NY (US)

(72) Inventors: Xiao Ming Bao, Beijing (CN); Kuan Feng, Markham (CA); Su Lei, Beijing (CN); Junfeng Liu, Markham (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/628,850

(22) Filed: Jun. 21, 2017

(65) Prior Publication Data
US 2018/0373540 A1 Dec. 27, 2018

(51) Int. Cl.
G06F 9/46 (2006.01)
G06F 9/38 (2018.01)
G06F 9/50 (2006.01)

(52) U.S. Cl.
CPC .......... *G06F 9/3855* (2013.01); *G06F 9/3877* (2013.01); *G06F 9/5038* (2013.01)

(58) Field of Classification Search
CPC ..... G06F 9/3855; G06F 9/3877; G06F 9/5038
See application file for complete search history.

(56) References Cited

U.S. PATENT DOCUMENTS

| | | | |
|---|---|---|---|
| 8,669,990 B2 | 3/2014 | Sprangle et al. | |
| 9,092,267 B2 | 7/2015 | Arvo | |
| 9,152,601 B2 | 10/2015 | Kaminski et al. | |
| 9,158,569 B2 | 10/2015 | Mitra et al. | |
| 9,996,810 B2 * | 6/2018 | Augenstein | G06Q 10/06314 |
| 2007/0022424 A1 * | 1/2007 | Heirich | G06F 8/445 718/102 |
| 2007/0113223 A1 * | 5/2007 | Ludwig | G06F 8/445 717/161 |
| 2014/0075161 A1 * | 3/2014 | Zhang | G06F 8/453 712/220 |

(Continued)

OTHER PUBLICATIONS

Dollinger et al., "CPU+GPU Load Balance Guided by Execution Time Prediction," Fifth International Workshop on Polyhedral Compilation Techniques (IMPACT 2015), Jan. 19, 2015 (9 pages).

(Continued)

*Primary Examiner* — Adam Lee
(74) *Attorney, Agent, or Firm* — Griffiths & Seaton PLLC

(57) ABSTRACT

Embodiments for graphical processing unit (GPU) resource sharing in a computing cluster, by a processor device. Resource-specific stages are dynamically generated in a directed acyclic graph (DAG) using a DAG interpreter for a set of tasks by creating equivalence stages in the DAG having an associated inserted set of shuffle stages, the equivalence stages created based on a determined cost of each stage of the set of shuffle stages. Backlog tasks are scheduled and tasks within the set of tasks are shifted among respective stages in the equivalence stages according to the determined cost to avoid overlapping allocation of the GPU resource during central processing unit (CPU) execution of the respective tasks of the set of tasks.

21 Claims, 7 Drawing Sheets

(56) References Cited

U.S. PATENT DOCUMENTS

2018/0203728 A1* 7/2018 Yan .................. G06F 9/4881

OTHER PUBLICATIONS

Li et al., "Co-processing SPMD Computation on GPUs and CPUs on Shared Memory System," portal.futuresystems.org, 2012 (13 pages).

Wen et al., "Smart Multi-Task Scheduling for OpenCL Programs on CPU/GPU Heterogeneous Platforms," High Performance Computing (HiPC), 2014 21st International Conference, Dec. 17-20, 2014 (10 pages).

* cited by examiner

US 10,552,161 B2

CLUSTER GRAPHICAL PROCESSING UNIT (GPU) RESOURCE SHARING EFFICIENCY BY DIRECTED ACYCLIC GRAPH (DAG) GENERATION

BACKGROUND OF THE INVENTION

Field of the Invention

The present invention relates in general to computing systems, and more particularly to, various embodiments for sharing graphical processing unit (GPU) resources within distributed computing environments.

Description of the Related Art

In today's interconnected and complex society, computers and computer-driven equipment are more commonplace. When performing compute-intensive workloads such as data analytics, an effective framework involves distributed parallel computing, which operates to disperse processing tasks across multiple processors operating on one or more computing devices such that parallel processing may be executed simultaneously. One platform for executing complex multi-stage applications and tasks, such as machine learning algorithms, graph processing, and other analytical algorithms is Apache Spark™ (or simply, Spark™).

SUMMARY OF THE INVENTION

Various embodiments for graphical processing unit (GPU) resource sharing in a computing cluster, by a processor device, are provided. In one embodiment, by way of example only, a method comprises, dynamically generating resource-specific stages in a directed acyclic graph (DAG) using a DAG interpreter for a set of tasks by creating equivalence stages in the DAG having an associated inserted set of shuffle stages, the equivalence stages created based on a determined cost of each stage of the set of shuffle stages; and scheduling backlog tasks and shifting tasks within the set of tasks among respective stages in the equivalence stages according to the determined cost to avoid overlapping allocation of the GPU resource during central processing unit (CPU) execution of the respective tasks of the set of tasks.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
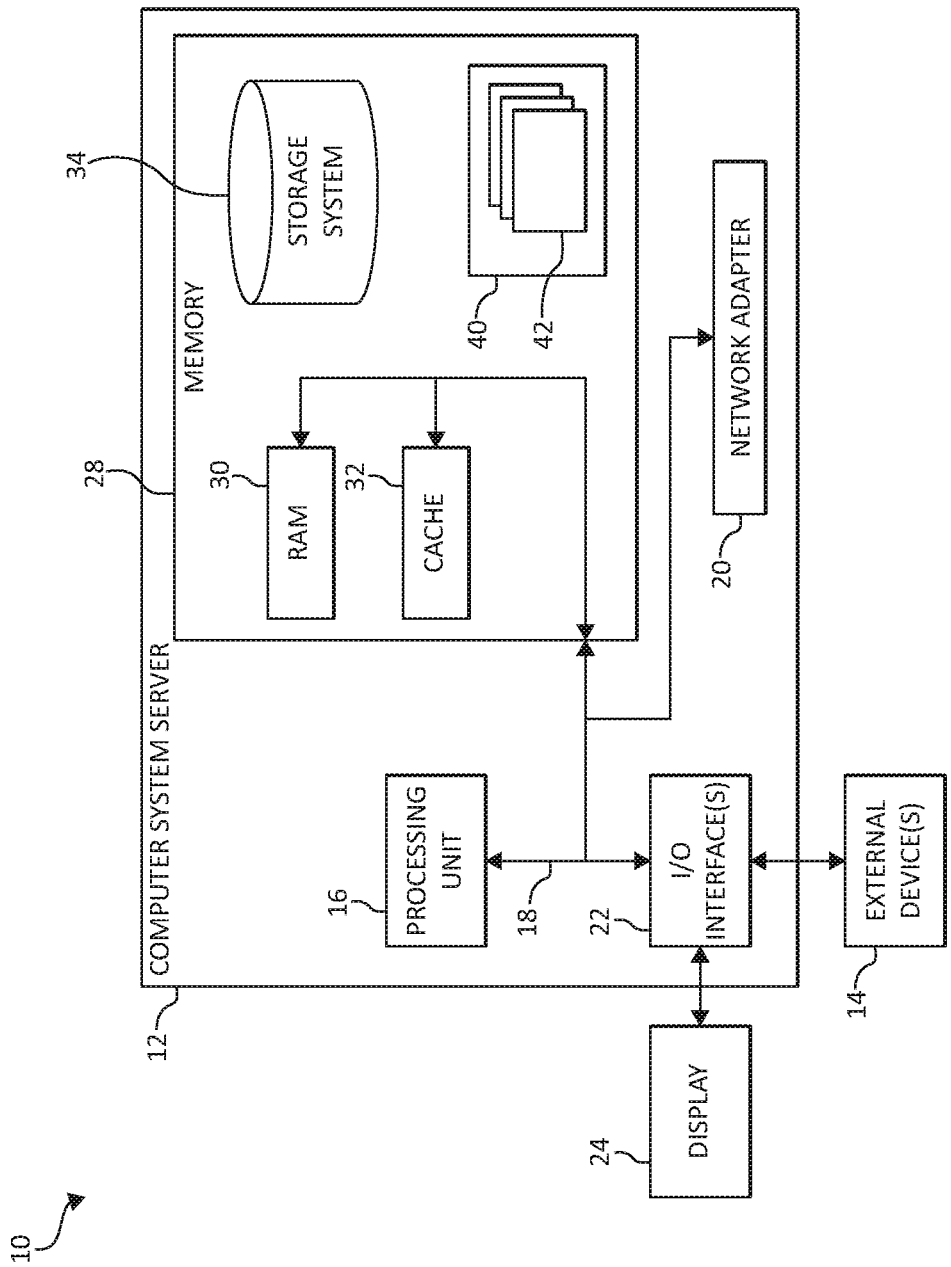
FIG. 1 is a block diagram depicting an exemplary computing node according to an embodiment of the present invention.

As aforementioned, when performing compute-intensive workloads such as data analytics, an effective framework involves distributed parallel computing, which operates to disperse processing tasks across multiple processors operating on one or more computing devices such that parallel processing may be executed simultaneously. Spark™ is a Directed Acyclic Graph (DAG) based computing platform providing a fast and general engine for large-scale data processing. Spark™ introduces a multi-stage (mostly) in-memory computing engine which allows for most computations in memory, as opposed to a disk-based MapReduce computation engine. For this reason, Spark™ may run more efficiently and with increased performance for certain applications. It should be noted that, although this disclosure uses Spark™ throughout as an example to implement the discussed functionality, the mechanisms taught herein are not limited to a particular application nor platform. Rather, the illustrated embodiments of the present invention may be implemented in a wide range of architectures and environments, as one of ordinary skill in the art would appreciate.

Spark™ uses a Resilient Distributed Dataset (RDD) to model the distributed collection of data. RDD indicates a read-only and partitionable distributed dataset, where part or all data of this dataset can be cached in the memory and reused between computations. Using this RDD model, jobs (tasks) are run stage by stage, the stages of which are built up by a DAG scheduler according to the RDD's shuffle dependency. The RDD dependency encompasses a narrow dependency and a wide dependency. In a narrow dependency, each partition of the parent RDD is used by at most one partition of the child RDD partition, which includes two scenarios. One scenario includes partitions of one parent RDD corresponding to partitions of one child RDD, and the second scenario includes partitions of two parent RDDs corresponding to partitions of one child RDD. In a wide dependency, partitions of the child RDD depend on all partitions of the parent RDD due to shuffle operations.

Shuffle is a specific phase in the MapReduce framework, which is located between the Map phase and the Reduce phase. If the output results of Map are to be used by Reduce, the output results must be hashed based on the key and distributed to each Reducer. This process is called Shuffle.

Shuffle involves the read and write of the disk and the transmission of the network, so that the performance of Shuffle directly affects the operation efficiency of the entire program. Shuffle in Spark™, or DAG-based computing platforms in general, divides a job or task into multiple stages. Shuffle is therefore a mechanism for redistributing data such that it's grouped differently across partitions.

With this background in mind, in any distributed computing platform, there are a variety of ways of integrating the graphical processing unit (GPU) with central processing unit (CPU) workloads. For example, in Spark™, portions of tasks may be GPU tasks which are mixed with the CPU workloads in the same stage. That is, in a given stage (or even a given task), there may be tasks or portions of tasks which require GPU resources to execute mixed with tasks which require CPU resources to complete.

In a "pure" integration, it is always assumed that each host in the cluster pool has the same hardware configuration, where every host is allocated its own GPU and field-programmable gate array (FPGA). In this model, the Spark™ scheduler (which will be further discussed below) does not identify which tasks need specific resources (whether CPU or GPU), but rather assumes that the task will be allocated the required resource from the host. Because the tasks are not separated nor identified by the scheduler, it is not possible to separate tasks requiring a specific (CPU or GPU) resource, which in many cases tends to cause an overload on a specific resource by allocating it with an unbalanced workload.

In a "hybrid" mode, a portion of hosts in the cluster have GPUs, which are allocated or distributed based on application or session levels of the given workload. That is, if the application/session requires GPU resources to execute a task, the task will be distributed to the hosts in the GPU pool. Using the hybrid mode, however, is inefficient as the DAG is generated in real time, such that the hybrid resource requirement cannot be effectively added prior to creation of the DAG, as it is continually developed.

Lastly, in a "conductor" approach, which uses an interface to generate an actual GPU RDD, all stages which contain the GPU RDD are considered as a GPU stage. Shuffle stages are then used to 'isolate' the GPU workload in the task(s), and tasks in GPU stages are distributed to GPU resource groups. However, because the DAG is still generated based on data relationships, GPU stages are always again mixed with CPU resources. Shuffle stages can thereby still be inserted to stage the GPU operation prior to and upon completion of the GPU RDD, however this introduces a shuffle overhead, which can also be inefficient. To wit, if a task spends more time on the CPU resource instead of the GPU resource it requires, yet the GPU resource has been allocated for the entire execution time (including the overlapping CPU resource execution time), the GPU resource is wasted by being allocated but not used which damages the overall GPU resource sharing in the cluster.

Accordingly, the present invention introduces novel methods for scheduling tasks to optimize GPU resources sharing a DAG-based computing platform (e.g., Spark™). These methods include such functionality as dynamically (in real time) using a user code interpreter to generate resource-specific stages in the DAG by creating "equivalence" stages which comprise translating the same task with a different sequence of where the shuffle stage is inserted during execution. The equivalence stages are optimized by estimating a cost for each of the stages in the equivalence stages to evaluate the shuffle effects (in various sequences) for the tasks, and a GPU share ratio. A top N number of candidate stages are selected based on the estimated cost (the cost being updated based on task execution metrics from each stage), and backlog tasks are scheduled and tasks shifted among stages in accordance with the candidate stages. An optimized DAG is then generated using the scheduled backlog tasks and shifted tasks to more efficiently utilize the GPU resources so as not to overlap executing tasks on the CPU resources while the GPU resources are allocated ("booked") for those tasks.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
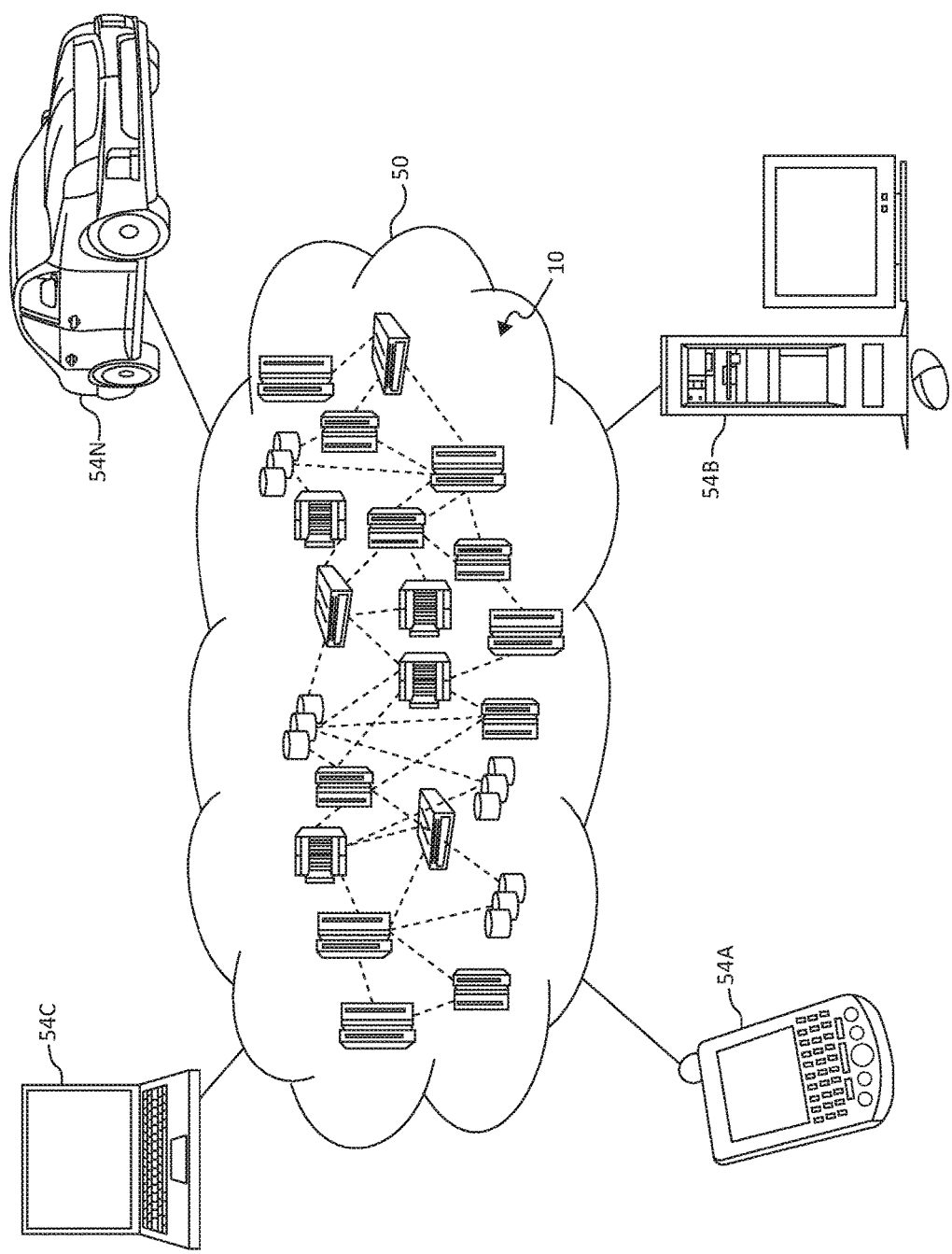
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
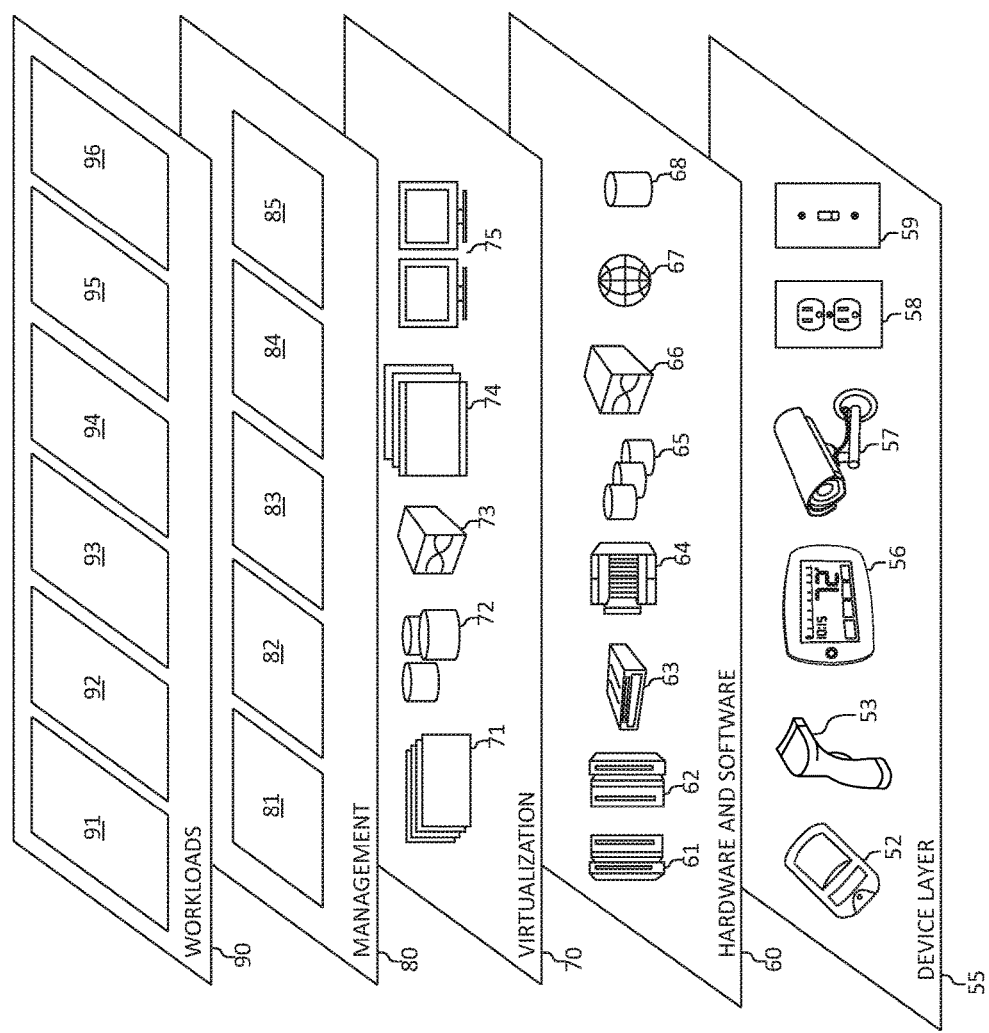
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, hand-held scanner 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning and large-scale data processing workloads and functions 96.

As previously introduced and by way of further background, a Spark™ application includes a single driver process and a set of executor and processes distributed across nodes on the cluster. The driver is the process controlling the high-level control flow of requested work. The executor and processes are responsible for executing the work (i.e., tasks). To begin a given job, Spark™ examines the graph of RDDs on which that action depends and formulates an execution plan. This plan begins with RDDs that do not depend on other RDDs, or reference data which has already been cached; and culminates in the final RDD required to produce the action's results. This execution plan consists of assembling the job's transformations into stages. A stage corresponds to a collection of tasks that all execute the same code, each on a different subset of the data.

Figure 4A:
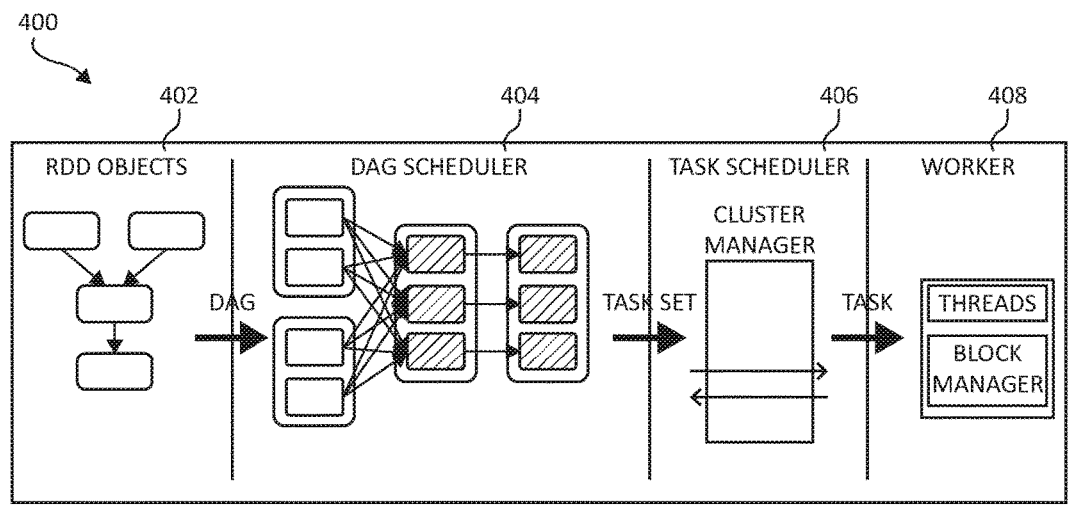
FIG. 4A is a block diagram depicting a high-level task scheduling and processing model of Spark™, in which various aspects of the present invention may be realized.

FIG. 4A is a block diagram depicting a high-level task scheduling and processing model 400 of Spark™. When creating the DAG, the Spark™ engine interpreter uses user code to generate the DAG based on RDD relationships, as referenced in block 402. The DAG scheduler divides jobs into stages and tasks in block 404, where resource demand drops to zero between stages. Upon creating the tasks, or task set, the task scheduler, referenced in block 406, requests resources from a cluster manager for execution of the task(s), and the task(s) are sent for execution as threads referenced by block 408, as discussed previously. When scheduling the tasks in block 406, it is important to note that resource request overhead is not ignorable as the cluster manager becomes the bottleneck if a significant resource request burst is initiated.

Figure 4B:
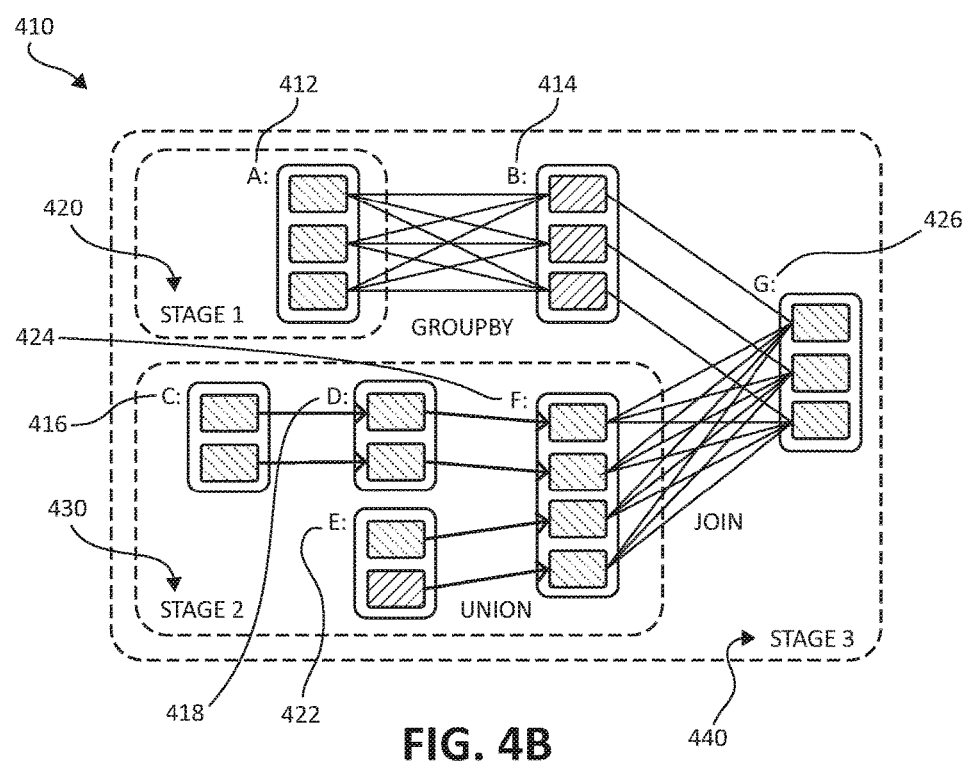
FIG. 4B is a block diagram depicting a transformation graph of stages and corresponding dependencies of tasks within Spark™, in which various aspects of the present invention may be realized.

FIG. 4B, a block diagram of a DAG 410 comprising an example of the computation of stages in Spark™ is depicted. DAG 410 includes RDDs in the boxes having solid outline including RDD-A 412, RDD-B 414, RDD-C 416, RDD-D 418, RDD-E 422, RDD-F 424, and RDD-G 426. Each RDD may encompass a narrow or wide dependency and comprises a plurality of partitions therein, including shaded partitions in RDD-B 414 and RDD-E 422 which indicate these partitions are in memory. DAG 410 also illustrates the transformation into job stages as discussed above, including stage 1 (420), stage 2 (430), and stage 3 (440). As depicted, the output RDD (RDD-B 414) of stage 1 (420) is already in memory.

Figure 4C:
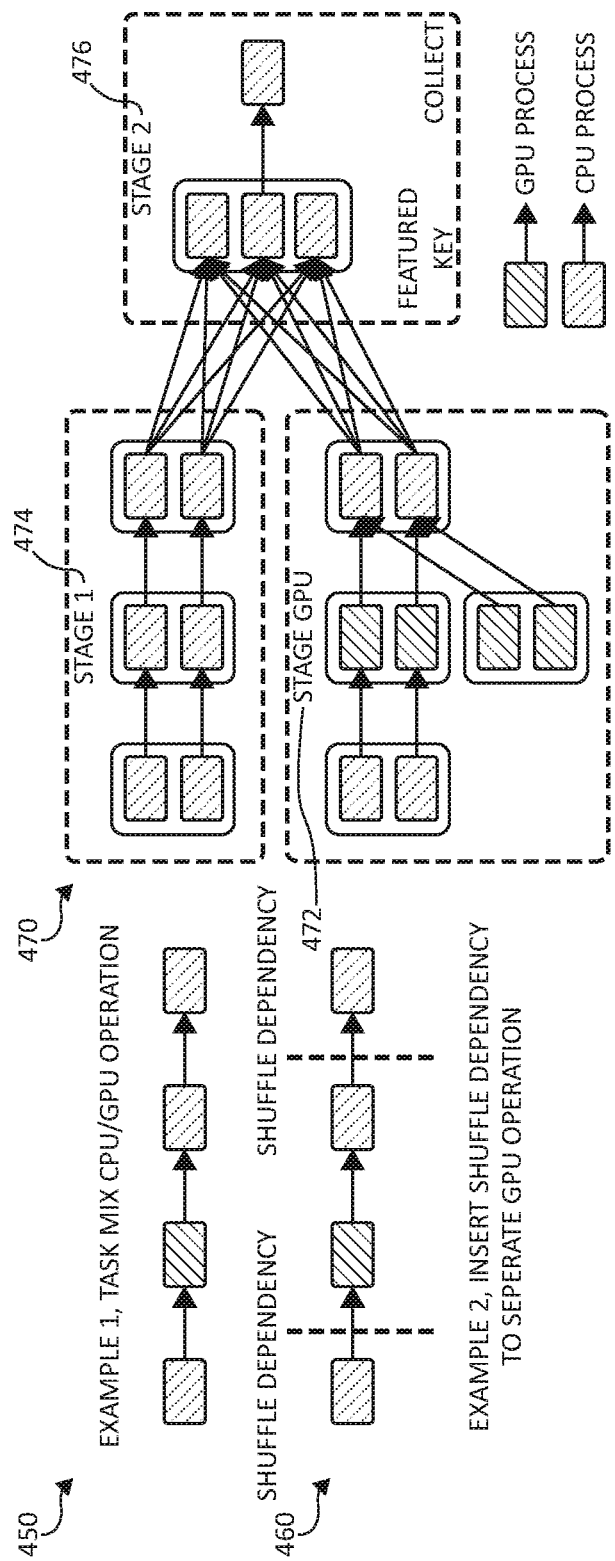
FIG. 4C is an additional set of block diagrams depicting a transformation graph of stages and corresponding dependencies of tasks within Spark™ referencing central processing unit (CPU) and graphical processing unit (GPU) integration, in which various aspects of the present invention may be realized.

FIG. 4C is an additional set of block diagrams depicting transformation graphs of stages and corresponding dependencies of tasks within Spark™ depicting CPU and GPU integration of tasks. Diagram 450 illustrates the mixing of GPU and CPU tasks during execution, and diagram 460 illustrates inserting shuffle dependencies to isolate or separate GPU operation of the tasks, as previously discussed. Diagram 470 illustrates the aforementioned "conductor" approach in an attempt to isolate GPU workloads with the depiction of stage 1 (474) holding CPU processes, stage GPU (472) holding mixed GPU and CPU processes, and stage 2 (476) being an output of stage 1 (474) and stage GPU (472) after the Reduce. As can be seen, even in the preferred conductor approach in which GPU processes are 'marked' and isolated, the output of stage 2 (476) still mixes GPU workloads according to RDD relationships built by the DAG.

Figure 5:
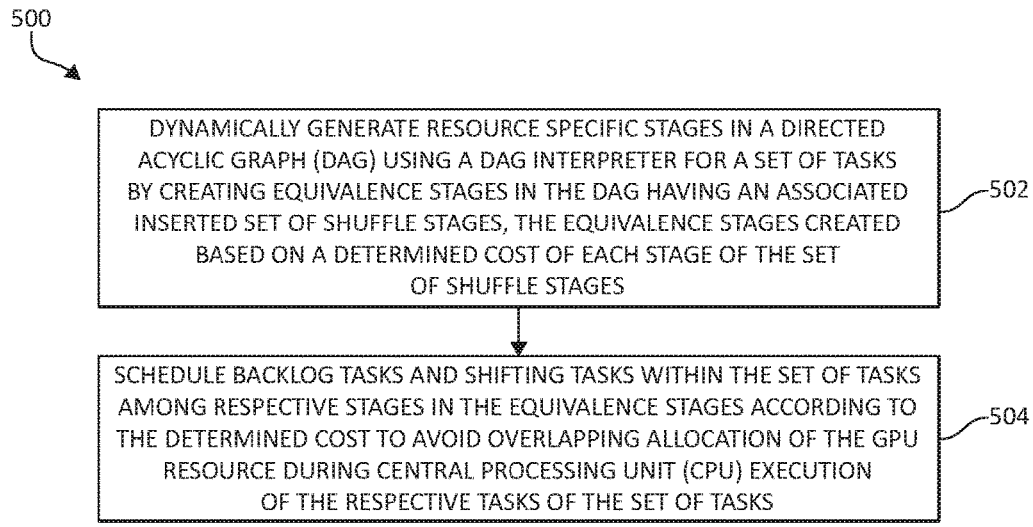
FIG. 5 is a flowchart diagram of an exemplary method for graphical processing unit (GPU) resource sharing in a computing cluster by a processor device, in accordance with aspects of the present invention.

Advancing, FIG. 5 is a flowchart diagram of an exemplary method 500 for GPU resource sharing in a computing cluster by a processor device. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 500 begins with dynamically generating resource-specific stages in a DAG using a DAG interpreter for a set of tasks by creating equivalence stages in the DAG having an associated inserted set of shuffle stages, the equivalence stages created based on a determined cost of each stage of the set of shuffle stages (step 502). Backlog tasks are scheduled and tasks within the set of tasks are shifted among respective stages in the equivalence stages according to the determined cost to avoid overlapping allocation of the GPU resource during central processing unit (CPU) execution of the respective tasks of the set of tasks (step 504). The method 500 ends.

Figure 6:
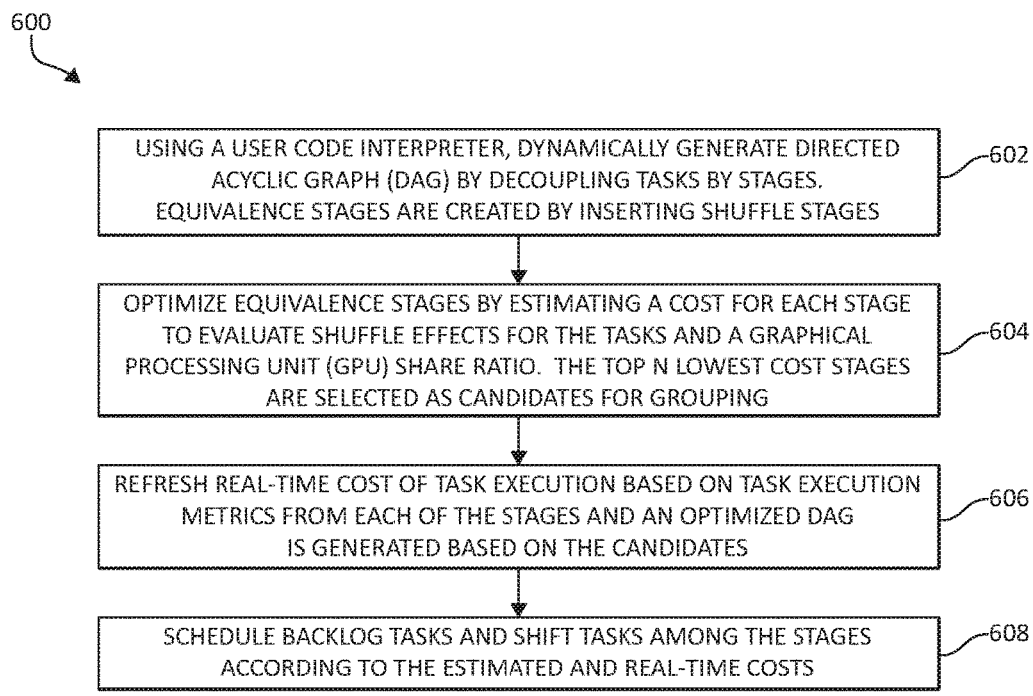
FIG. 6 is an additional flowchart diagram of an exemplary method for graphical processing unit (GPU) resource sharing in a computing cluster by a processor device, in accordance with aspects of the present invention.

FIG. 6 is an additional flowchart diagram of an exemplary method 600 for GPU resource sharing in a computing cluster by a processor device. The method 600 may be performed in accordance with the present invention in any of the environments depicted in FIGS. 1-3, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 600 begins with, using a user code (DAG) interpreter, dynamically generating an equivalence DAG by decoupling tasks by stages. The equivalence stages are created by inserting shuffle stages in various sequences and registering a cost of each stage (step 602). While current Spark™ implementations merely generate each stage based on the data's RDD relationship, for isolating GPU workloads (tasks), the DAG may be dynamically generated based upon the resources needed for the given task (or set of tasks) by inserting one or more shuffle stages to allow more efficient allocation of the GPU resources for the GPU workloads. For example, a task mix operation base sequence of CPU-GPU-CPU (which does not have any shuffle stages inserted) may be translated into separated stages by inserting shuffle stages variously in the sequence. For generating the equivalence DAG, the sequence may be separated into one of four stage options comprising:
(CPU)-Shuffle-(GPU-CPU);
(CPU-GPU)-Shuffle-(CPU);
(CPU)-Shuffle-(GPU)-Shuffle-(CPU); or
(CPU-GPU-CPU).

Continuing from step 602, the equivalence stages are then optimized by estimating a cost for each stage to evaluate shuffle effects for the tasks and a GPU share ratio. The top N lowest cost stages are selected as candidate stages for grouping the tasks (step 604). When optimizing the tasks for distribution, a priority of the equivalence stages is determined and set. The priority is determined by examining a number of backlog tasks, the estimated cost of the shuffle stages in various stage sequences, and a cost of allocating the GPU for executing the tasks versus an overall CPU overhead. The cost of the shuffle stages is determined by evaluating such characteristics as shuffle size and network traffic, and/or an overall roundtrip time to execute the tasks.

In some embodiments, when optimizing the equivalence stages for the equivalence DAG, it is unnecessary to actually run tasks on all equivalence stages to understand which execution past is most efficient. This is because evaluation of the current equivalence stage is based on certain costs, as previously discussed. These costs may include:
A shuffle stage induced shuffle overhead (expressed as T–S);
A GPU execution time (expressed as T–G); and
A CPU overhead (expressed as T–C).

Using a base case sequence (e.g., CPU-GPU-CPU which does not insert any shuffle stages) where:
CPU execution time (expressed as T–Cbase); and
GPU execution time (expressed as T–Gbase=T–G), the costs can be estimated as to whether any of the equivalence stage options are candidates for the execution plan based on whether the base case sequence (T–Cbase) is less than or equal to the shuffle overhead (T–S) when combined with the CPU overhead (T–C).

The shuffle cost can additionally be estimated based on the locality of the shuffle stage and the partition number obtained from the DAG, where the shuffle overhead may be expressed as:

$$T-S=\text{PartitionNumber}*\text{PartitionSize}/\text{AverageShuffle-Cost}$$

and where:

$$\text{AverageShuffleCost}=w*\text{ShuffleSize(previous)}/\text{ShuffleTime(previous)}+(1-w)*\text{ShuffleSize(current)}/\text{ShuffleTime(current)}.$$

Upon obtaining the shuffle overhead (T–S), and evaluating the CPU overhead (T–C) collected from a base case sequence (T–Gbase), the cost of each stage may be formulated as:

$$\text{Cost}=(T-S+T-C)/T-G\text{base}.$$

Continuing to step 606 in the method 600, real-time costs of task execution for each of the tasks are refreshed based on task execution metrics from each of the stages and an optimized DAG is created based on the candidates as per the following in step 608. In step 608, backlog tasks are scheduled and tasks are shifted among the stages according to the estimated and real-time costs. When scheduling and distributing tasks among the various stages, the calculations referenced in step 604 give an order of cost for each equivalence stage. During runtime, tasks are executed using the base case (T–Gbase, or CPU-GPU-CPU), and the cost for each equivalence stage is estimated using the aforementioned calculations. The top N lowest cost options, where N is a configurable number, are selected as candidate stage sequences, for example:
(CPU)-shuffle-(GPU-CPU); or
(CPU-GPU)-shuffle-(CPU).

Upon selecting the top N lowest cost options, the tasks are grouped and distributed based on the new DAG tree, having implemented the candidate stage sequences. Upon execution, the real-time task metrics of each stage are refreshed to thereby update the cost of the equivalence stages, as they are scheduled to run. Additionally, backlog tasks are migrated to the lowest cost stages in the DAG tree, rather than remaining on the same stage in their order of execution. The method 600 ends.

Figure 7:
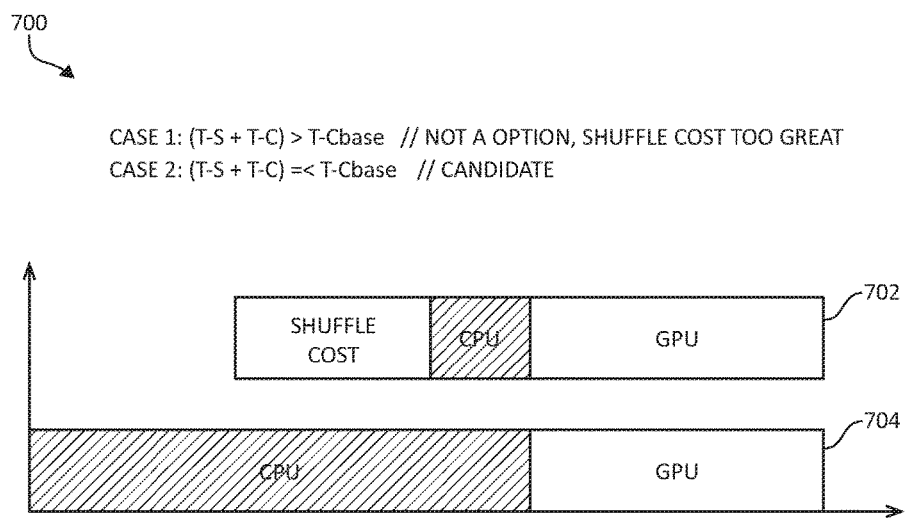
FIG. 7 is a graph diagram depicting central processing unit (CPU) and graphical processing unit (GPU) stages with an associated shuffle stage overhead, in accordance with aspects of the present invention.

FIG. 7 is a graph diagram 700 depicting CPU and GPU stages with an associated shuffle stage overhead, illustrating the aforementioned cost example in FIG. 6. Diagram 700 is representative of two cases: Case 1: where (T–S+T–C)>T–Cbase (shown as 702) is not an option, because the shuffle cost is too great. In other words, the shuffle overhead (T–S) combined with the CPU overhead (T–C) is greater than the CPU execution time (T–Cbase). In Case 2: where (T–S+T–C) T–Cbase (shown as 704) is a candidate option as the shuffle overhead (T–S) combined with the CPU overhead (T–C) is equal to or less than the CPU execution time (T–Cbase).

Again, a top N number of candidate stages are selected based on the estimated cost. Backlog tasks are then scheduled and running tasks are shifted according to the candidate stages. The optimized DAG is then generated using the scheduled backlog tasks and shifted tasks to more efficiently utilize the GPU resources so as not to overlap executing tasks on the CPU resources while the GPU resources are allocated ("booked") for those tasks. To wit, GPU utilization in the overall cluster is improved, as tasks do not overspend time on CPU execution while the GPU resource is allocated to the tasks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for graphical processing unit (GPU) resource sharing in a computing cluster, executed by a processor device, comprising:
   dynamically generating resource-specific stages in a directed acyclic graph (DAG) using a DAG interpreter for a set of tasks by creating equivalence stages in the DAG having an associated inserted set of shuffle stages, the equivalence stages created based on a determined cost of each stage of the associated set of shuffle stages;
   scheduling backlog tasks of the set of tasks and shifting certain tasks of the set of tasks among different stages in the equivalence stages according to the determined cost to avoid overlapping allocation of the GPU resource during central processing unit (CPU) execution of the set of tasks; and
   executing the set of tasks in an order specified in the DAG, the order considering the scheduling of the backlog tasks and shifted tasks according to the determined cost of each stage of the associated set of shuffle stages.

2. The method of claim 1, further including determining the cost for each shuffle stage in the equivalence stages by evaluating shuffle effects of the inserted shuffle stages for the set of tasks including a GPU share ratio, wherein the shuffle effects comprise an estimated shuffle overhead created by the inserted shuffle stages.

3. The method of claim 1, further including optimizing the equivalence stages based on the determined cost by setting a priority of the equivalence stages;
   wherein the priority is used to group and distribute the certain tasks within the set of tasks according to the determined cost of respective shuffle stages in the equivalence stages.

4. The method of claim 3, further including setting the priority according to at least one of:
   a number of the backlog tasks; and
   a task execution time using the GPU versus using the CPU when executing the set of tasks.

5. The method of claim 3, further including, during runtime, commencing execution of the set of tasks while not inserting the set of shuffle stages; and
   estimating the determined cost while selecting a top N lowest cost stages as candidate stages.

6. The method of claim 5, further including refreshing the determined cost based on task execution metrics from each respective stage in the equivalence stages.

7. The method of claim 6, further including optimizing the DAG using the candidate stages; wherein backlog tasks are migrated to the lowest cost stages.

8. A system for graphical processing unit (GPU) resource sharing in a computing cluster, the system comprising:
   a processor device executing instructions stored in a memory, wherein the processor device:
      dynamically generates resource-specific stages in a directed acyclic graph (DAG) using a DAG interpreter for a set of tasks by creating equivalence stages in the DAG having an associated inserted set of shuffle stages, the equivalence stages created based on a determined cost of each stage of the associated set of shuffle stages;

schedules backlog tasks of the set of tasks and shifting certain tasks of the set of tasks among different stages in the equivalence stages according to the determined cost to avoid overlapping allocation of the GPU resource during central processing unit (CPU) execution of the set of tasks; and executes the set of tasks in an order specified in the DAG, the order considering the scheduling of the backlog tasks and shifted tasks according to the determined cost of each stage of the associated set of shuffle stages.

9. The system of claim 8, wherein the processor device determines the cost for each shuffle stage in the equivalence stages by evaluating shuffle effects of the inserted shuffle stages for the set of tasks including a GPU share ratio, wherein the shuffle effects comprise an estimated shuffle overhead created by the inserted shuffle stages.

10. The system of claim 8, wherein the processor device optimizes the equivalence stages based on the determined cost by setting a priority of the equivalence stages; wherein the priority is used to group and distribute the certain tasks within the set of tasks according to the determined cost of respective shuffle stages in the equivalence stages.

11. The system of claim 10, wherein the processor device sets the priority according to at least one of:
a number of the backlog tasks; and
a task execution time using the GPU versus using the CPU when executing the set of tasks.

12. The system of claim 10, wherein the processor device, during runtime, commences execution of the set of tasks while not inserting the set of shuffle stages; and
estimates the determined cost while selecting a top N lowest cost stages as candidate stages.

13. The system of claim 12, wherein the processor device refreshes the determined cost based on task execution metrics from each respective stage in the equivalence stages.

14. The system of claim 13, wherein the processor device optimizing the DAG using the candidate stages; wherein backlog tasks are migrated to the lowest cost stages.

15. A computer program product for graphical processing unit (GPU) resource sharing in a computing cluster, by a processor device, the computer program product embodied on a non-transitory computer-readable storage medium having computer-readable program code portions stored therein, the computer-readable program code portions comprising:
an executable portion that dynamically generates resource-specific stages in a directed acyclic graph (DAG) using a DAG interpreter for a set of tasks by creating equivalence stages in the DAG having an associated inserted set of shuffle stages, the equivalence stages created based on a determined cost of each stage of the associated set of shuffle stages;

an executable portion that schedules backlog tasks of the set of tasks and shifting certain tasks of the set of tasks among different stages in the equivalence stages according to the determined cost to avoid overlapping allocation of the GPU resource during central processing unit (CPU) execution of the set of tasks; and an executable portion that executes the set of tasks in an order specified in the DAG, the order considering the scheduling of the backlog tasks and shifted tasks according to the determined cost of each stage of the associated set of shuffle stages.

16. The computer program product of claim 15, further including an executable portion that determines the cost for each shuffle stage in the equivalence stages by evaluating shuffle effects of the inserted shuffle stages for the set of tasks including a GPU share ratio, wherein the shuffle effects comprise an estimated shuffle overhead created by the inserted shuffle stages.

17. The computer program product of claim 15, further including an executable portion that optimizes the equivalence stages based on the determined cost by setting a priority of the equivalence stages; wherein the priority is used to group and distribute the certain tasks within the set of tasks according to the determined cost of respective shuffle stages in the equivalence stages.

18. The computer program product of claim 17, further including an executable portion that sets the priority according to at least one of:
a number of the backlog tasks; and
a task execution time using the GPU versus using the CPU when executing the set of tasks.

19. The computer program product of claim 17, further including an executable portion that, during runtime, commences execution of the set of tasks while not inserting the set of shuffle stages; and
an executable portion that estimates the determined cost while selecting a top N lowest cost stages as candidate stages.

20. The computer program product of claim 19, further including an executable portion that refreshes the determined cost based on task execution metrics from each respective stage in the equivalence stages.

21. The computer program product of claim 20, further including an executable portion that optimizes the DAG using the candidate stages; wherein backlog tasks are migrated to the lowest cost stages.

* * * * *